United States Patent
Izaki et al.

(10) Patent No.: US 9,815,707 B2
(45) Date of Patent: *Nov. 14, 2017

(54) METHOD OF PROCESSING DISCHARGE GAS DISCHARGED FROM PRODUCTION PROCESS

(71) Applicant: JAPAN PIONICS CO., LTD., Kanagawa (JP)

(72) Inventors: Kansei Izaki, Kanagawa (JP); Masanori Iwaki, Kanagawa (JP); Yasusada Miyano, Kanagawa (JP); Toshio Akiyama, Kanagawa (JP)

(73) Assignee: JAPAN PIONICS CO., LTD., Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/972,278

(22) Filed: Dec. 17, 2015

(65) Prior Publication Data

US 2016/0101987 A1   Apr. 14, 2016

Related U.S. Application Data

(62) Division of application No. 14/259,193, filed on Apr. 23, 2014, now abandoned.

(30) Foreign Application Priority Data

Apr. 26, 2013 (JP) ................... 2013-093465
Jun. 18, 2013 (JP) ................... 2013-127333

(51) Int. Cl.
  *C01C 1/12* (2006.01)
  *C01B 3/04* (2006.01)
  *C01B 3/50* (2006.01)

(52) U.S. Cl.
  CPC ............. *C01C 1/12* (2013.01); *C01B 3/047* (2013.01); *C01B 3/505* (2013.01); *Y02E 60/364* (2013.01); *Y02P 20/129* (2015.11)

(58) Field of Classification Search
  CPC ........................................... C01C 1/12
  See application file for complete search history.

(56) References Cited

U.S. PATENT DOCUMENTS

| | | | |
|---|---|---|---|
| 3,469,372 A | 9/1969 | Yamauchi | |
| 8,889,090 B2 * | 11/2014 | Izaki | F25J 3/08 423/215.5 |
| 2006/0099123 A1 | 5/2006 | Seeley | |
| 2013/0312456 A1 * | 11/2013 | Izaki | C01C 1/12 62/617 |

FOREIGN PATENT DOCUMENTS

| | | | | |
|---|---|---|---|---|
| EP | 1452220 A1 | 9/2004 | | |
| JP | 8-57256 A | 3/1996 | | |
| JP | 8-84910 A | 4/1996 | | |
| JP | 2000-233117 A | 8/2000 | | |
| JP | 2000-317246 A | 11/2000 | | |
| JP | EP 1452220 A1 * | 9/2004 | | B01D 53/46 |
| JP | 2008-7378 A | 1/2008 | | |

* cited by examiner

*Primary Examiner* — Melvin C Mayes
(74) *Attorney, Agent, or Firm* — Fitch, Even, Tabin & Flannery, LLP

(57) ABSTRACT

The present invention provides a method of processing discharge gas containing ammonia, hydrogen, nitrogen, and an organic metal compound discharged from the production process of a gallium nitride compound semiconductor. The discharge gas is brought into contact with a cleaning agent prepared by impregnating an alkali metal compound with a metal oxide to remove the organic metal compound from the discharge gas. The discharge gas from which an organic metal compound is removed is brought into contact with an ammonia decomposition catalyst on heating to decompose the ammonia into nitrogen and hydrogen. The discharge gas in which ammonia is decomposed is brought into contact with palladium alloy membrane on heating to recover hydrogen that has penetrated through the palladium alloy membrane. After an organic metal compound is removed to liquefy the ammonia contained in the discharge gas as described above, a pressurization process and a cooling process is conducted by a heat pump to pressurize and cool the discharge gas from which an organic metal compound is removed to liquefy the ammonia contained in the discharge gas and separate the liquefied ammonia from hydrogen and nitrogen so as to recover the liquefied ammonia. The recovered hydrogen and ammonia are supplied to and reused in the production process of a gallium nitride compound semiconductor.

16 Claims, 4 Drawing Sheets

METHOD OF PROCESSING DISCHARGE GAS DISCHARGED FROM PRODUCTION PROCESS

CROSS-REFERENCE TO RELATED APPLICATION

This application is a divisional application of U.S. application Ser. No. 14/259,193, filed Apr. 23, 2014, now abandoned, the contents of which are incorporated herein by reference.

TECHNICAL FIELD

The present invention relates to a method of recovering hydrogen or ammonia from discharge gas containing ammonia, hydrogen, nitrogen, and an organic metal compound discharged from the production process of a gallium nitride compound semiconductor. The present invention also relates to a method of reusing hydrogen or ammonia by supplying the recovered hydrogen or ammonia as a source gas to the production process of a gallium nitride compound semiconductor.

BACKGROUND ART

The gallium nitride compound semiconductor is used much as devices such as a light emitting diode and a laser diode. In this production process of a gallium nitride compound semiconductor (gallium nitride compound semiconductor process), a gallium nitride compound is vapor-grown on a substrate of sapphire or the like by the MOCVD method. As the source gas used for the production process, for example, trimethylgallium, trimethylindium, and trimethylaluminum as the group III metal source and ammonia as the group V nitrogen source are used. In addition to these source gases, hydrogen and nitrogen are used as the carrier gases.

Ammonia used as the source gas of the production process is highly-pure ammonia generated by distilling or rectifying ammonia for industrial purposes or high-priced ammonia generated by purifying this highly-pure ammonia because it is required to have an extremely high purity. On the other hand, hydrogen used as a carrier gas is produced industrially, for example, by a process using the steam reforming method for generating hydrogen from a hydrocarbon such as liquefied petroleum gas or liquefied natural gas (including a desulphurization process, a steam reforming process, and a hydrogen purification (PSA system) process). However, since hydrogen used as a carrier gas is required to have an extremely high purity as well as ammonia as a source gas, highly-pure hydrogen obtained, for example, by permeating through palladium alloy membrane is used as a carrier gas.

The ammonia used in the production process as described above is highly priced and purified. However, the acceptable concentration of ammonia contained in the discharge gas is 25 ppm because of the high toxicity. Thus, discharge gas containing such ammonia emitted into the atmosphere has harmful effects on the human body and the environment. Accordingly, it is necessary to first conduct the decomposition or the removal, or the like of ammonia contained in discharge gas discharged from the production process and to then emit the purified gas into the atmosphere. For example, Patent documents 1 to 3 disclose a processing method including bringing discharge gas containing ammonia into contact with an ammonia decomposition catalyst on heating to decompose the ammonia into nitrogen and hydrogen.

Moreover, Patent document 4 proposes a method of recovering ammonia gas having a dissolution step of dissolving ammonia of discharge gas discharged from the processing step of the production process in water, a distillation process of distilling the aqueous ammonia in which ammonia is dissolved to separate ammonia from water, and a liquefaction step of liquefying the separated ammonia. In addition, Patent document 5 proposes a method of recovering ammonia including aerating discharge gas containing ammonia discharged from the production process of a gallium nitride compound semiconductor and the like in a multitubular adsorber filled with ammonia adsorbent on cooling to adsorb and collect ammonia from the discharge gas; and removing ammonia under reduced pressure while heating the multitubular adsorber.

CITATION LIST

Patent Literature

Patent document 1: JP 8-57256 A
Patent document 2: JP 8-84910 A
Patent document 3: JP 2000-233117 A
Patent document 4: JP 2008-7378 A
Patent document 5: JP 2000-317246 A

SUMMARY OF INVENTION

Technical Problem

In the ammonia decomposition method described in Patent documents 1 to 3, highly-pure and -priced ammonia is used. However, the most part is not used in the production method (semiconductor process) and thus disposed after decomposed into nitrogen and hydrogen. Moreover, highly-pure hydrogen is also disposed as is, not being involved in the reaction in the semiconductor process. Therefore, it is desired that highly-pure hydrogen discharged from the semiconductor process be recovered and reused.

On the other hand, in the ammonia recovery method described in Patent document 4, the ammonia dissolution step needs to be repeated to increase the concentration (purity) of ammonia. Moreover, in the ammonia recovery method described in Patent document 4, the source gas used for the production process needs to highly dehumidify ammonia obtained by distilling aqueous ammonia that has reached a predetermined concentration because the source gas is required to be an extremely low water concentration.

Moreover, the ammonia gas recovery device described in Patent document 5 can inconveniently adsorb, collect, and recover ammonia in a small amount.

Therefore, the objective of the present invention is to provide a method of efficiently and easily recovering hydrogen or ammonia from discharge gas discharged from the production process of gallium nitride compound semiconductor and a method of reusing the recovered hydrogen or ammonia.

Solution to Problem

As a result of their extensive studies to solve these problems, the present inventors found that after brought into contact with a cleaning agent prepared by impregnating an alkali metal compound with a metal oxide to remove an organic metal compound and decomposed with an ammonia decomposition catalyst, discharge gas discharged from the production process of a gallium nitride compound semiconductor not basically contains substances other than inert gas (chlorinate gas, hydrocarbon, metallic compound, etc.) but contains hydrogen in a large amount. The present inventors also found that the highly-pure hydrogen is efficiently and easily obtained from the discharge gas after the ammonia decomposition by using the hydrogen permselectivity of palladium alloy membrane. The present inventors achieved the method of recovering hydrogen and the method of reusing hydrogen by using the same of the present invention.

The present inventors also found that after an organic metal compound is removed from discharge gas discharged from the production process of a gallium nitride compound semiconductor as described above, ammonia contained in the discharge gas is subjected to a pressurization process and a cooling process by a heat pump so that ammonia contained in the discharge gas can be efficiently liquefied in a high concentration and easily separated from hydrogen and nitrogen. The present inventors also found that the main components of impurities in ammonia recovered by the recovery method are hydrogen and nitrogen having no harmful effects on the production process of a gallium nitride compound semiconductor. The present inventors achieved the method of recovering ammonia and the method of reusing ammonia by using the same as the present invention.

The present invention is a method of recovering hydrogen including: a removal step of bringing discharge gas containing ammonia, hydrogen, nitrogen, and an organic metal compound discharged from the production process of a gallium nitride compound semiconductor into contact with a cleaning agent prepared by impregnating an alkali metal compound with a metal oxide to remove the organic metal compound from the discharge gas; an ammonia decomposition step of bringing the discharge gas from which an organic metal compound is removed after the removal step into contact with an ammonia decomposition catalyst on heating to decompose the ammonia into nitrogen and hydrogen; and a hydrogen recovery step of bringing the discharge gas in which ammonia is decomposed after the ammonia decomposition step into contact with palladium alloy membrane on heating to recover hydrogen that has penetrated through the palladium alloy membrane.

The present invention is also a method of reusing hydrogen including a resupply step of supplying hydrogen recovered by the method of recovering hydrogen to the production process.

The present invention is also a method of recovering ammonia including: a removal step of bringing discharge gas containing ammonia, hydrogen, nitrogen, and an organic metal compound discharged from the production process of a gallium nitride compound semiconductor into contact with a cleaning agent prepared by impregnating an alkali metal compound with a metal oxide to remove the organic metal compound from the discharge gas; and an ammonia recovery step of conducting a pressurization process and a cooling process by a heat pump to pressurize and cool the discharge gas from which an organic metal compound is removed after the removal step to liquefy the ammonia contained in the discharge gas and separate the liquefied ammonia from hydrogen and nitrogen so as to recover the liquefied ammonia.

The present invention is also a method of reusing ammonia including: a mixed gas generation step of evaporating liquefied ammonia recovered by the method of recovering ammonia and mixing the evaporated ammonia with additional ammonia which is different from the evaporated ammonia to obtain mixed gas; and a resupply step of purifying the mixed gas after the mixed gas generation step and supplying the purified mixed gas to the production process.

Advantageous Effects of Invention

The method of recovering hydrogen from discharge gas discharged from the production process of a gallium nitride compound semiconductor and the method of reusing hydrogen by using the same in the present invention conducts the removal step of removing an organic metal compound from discharge gas discharged from the production process; brings the discharge gas from removal step of removing an organic metal compound into contact with an ammonia decomposition catalyst on heating; and conducts the hydrogen recovery step of bringing the discharge gas into contact with palladium alloy membrane on heating to recover hydrogen. Thus, the discharge gas can be efficiently heated for the present invention. Since purified hydrogen with a high purity can be obtained by the hydrogen recovery step, the purified hydrogen can be reused in the production process as is.

The method of recovering ammonia from discharge gas discharged from the production process of a gallium nitride compound semiconductor and the method of reusing ammonia by using the same in the present invention conducts the removal step of removing an organic metal compound from discharge gas discharged from the production process of a gallium nitride compound semiconductor; and the ammonia recovery step of conducting a pressurization process and a cooling process by a heat pump to pressurize and cool the discharge gas from which an organic metal compound is removed to liquefy ammonia contained in the discharge gas and separate the liquefied ammonia from hydrogen and nitrogen so as to recover the liquefied ammonia. Thus, ammonia can be efficiently and easily recovered as liquid ammonia. Moreover, the main components of impurities in the recovered ammonia are hydrogen and nitrogen having no harmful effects on the production process, so that the recovered ammonia after easily purified can be supplied to the production process and reused.

DESCRIPTION OF EMBODIMENTS

The present invention is applied to a method of recovering hydrogen including a removal step of removing an organic metal compound from discharge gas discharged from the production process of a gallium nitride compound semiconductor, an ammonia decomposition step of decomposing ammonia into nitrogen and hydrogen after the removal step, and a hydrogen recovery step of recovering hydrogen from the discharge gas containing hydrogen and nitrogen after the ammonia decomposition by a hydrogen separation method using the hydrogen permselectivity of palladium alloy membrane. The present invention is also applied to a method of reusing hydrogen including supplying the recovered hydrogen as a source gas to the production process of a gallium nitride compound semiconductor.

The present invention is also applied to a method of recovering ammonia including a removal step of removing an organic metal compound from discharge gas discharged from the production process of a gallium nitride compound semiconductor and an ammonia recovery step of conducting a pressurization process and a cooling process to pressurize and cool the discharge gas to liquefy ammonia contained in the discharge gas so as to recover the liquefied ammonia. The present invention is also applied to a method of reusing ammonia including supplying the recovered hydrogen as a source gas to the production process of a gallium nitride compound semiconductor. The production process of a gallium nitride compound semiconductor in the present invention is to conduct the crystal growth of a nitride semiconductor formed of a compound of one or more kinds of metals selected from gallium, indium, and aluminum and nitrogen.

The method of recovering hydrogen or ammonia from discharge gas discharged from the production process of a gallium nitride compound semiconductor and the method of reusing hydrogen or ammonia by using the same in the present invention will be explained below with reference to FIGS. 1 to 7. However, the present invention is not limited thereto.

Figure 1:
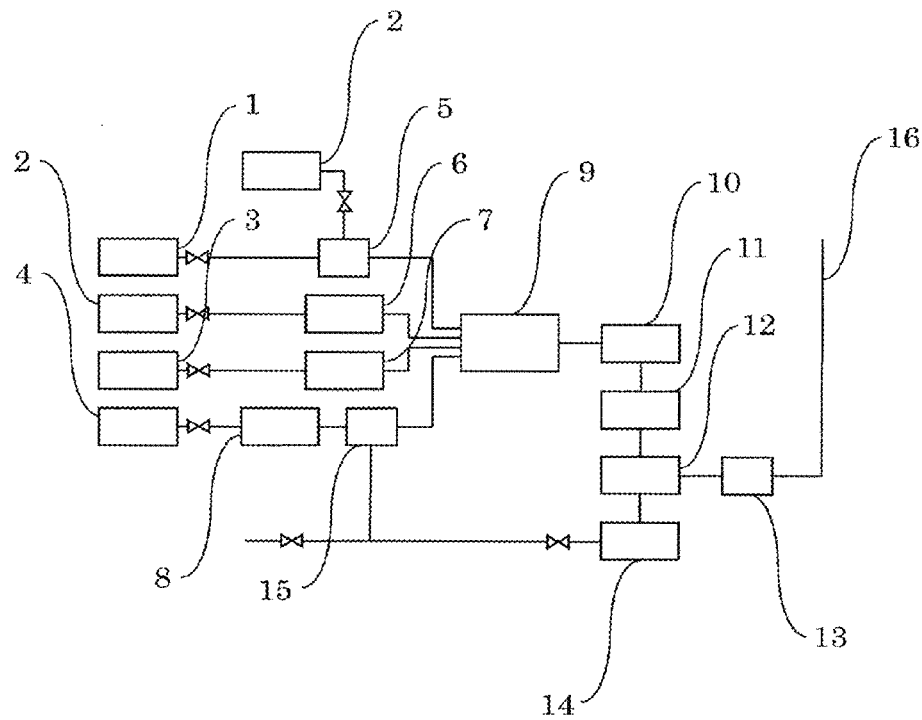
FIG. 1 shows a block diagram illustrating one example of a device system associated with the method of recovering hydrogen and the method of reusing hydrogen by using the same in the present invention.

FIG. 1 shows a block diagram illustrating one example of the device system associated with the method of recovering hydrogen and the method of reusing hydrogen by using the same in the present invention.

Figure 2:
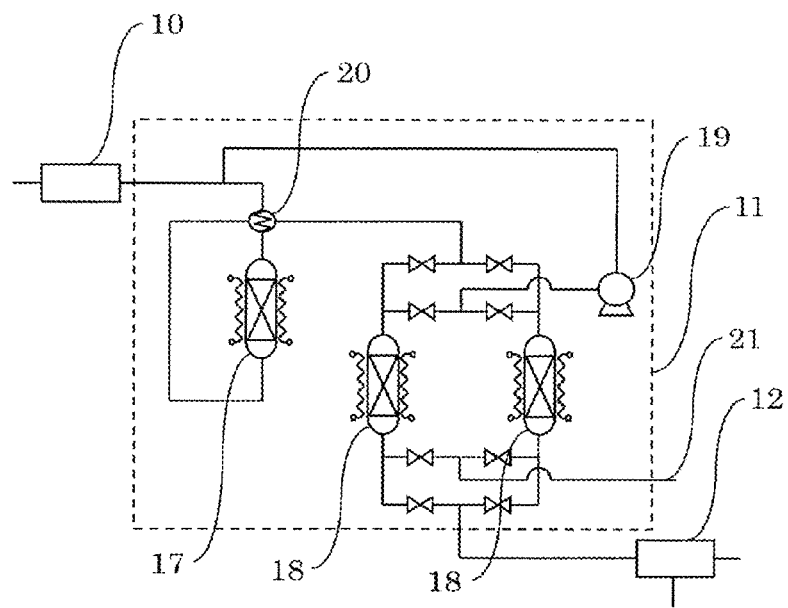
FIG. 2 shows a block diagram illustrating one example of an ammonia decomposer used in the present invention.

FIG. 2 shows a block diagram illustrating one example of the ammonia decomposer used in the present invention.

Figure 3:
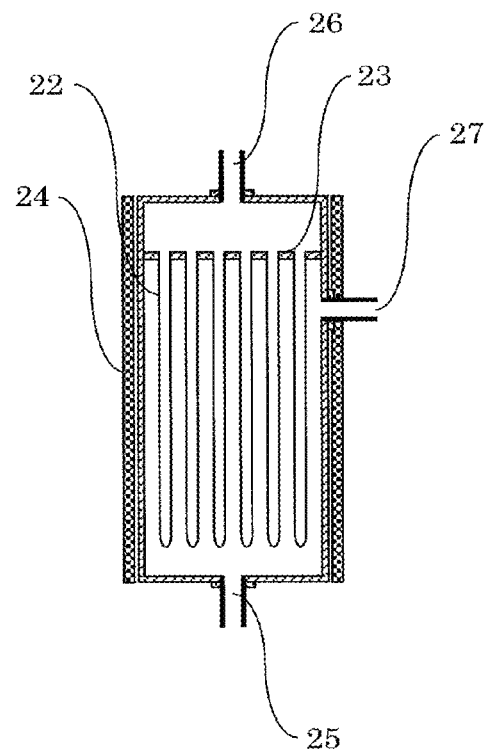
FIG. 3 shows a vertical sectional block diagram illustrating one example of a hydrogen separator used in the present invention.

FIG. 3 shows a vertical sectional block diagram illustrating one example of the hydrogen separator used in the present invention.

Figure 4:
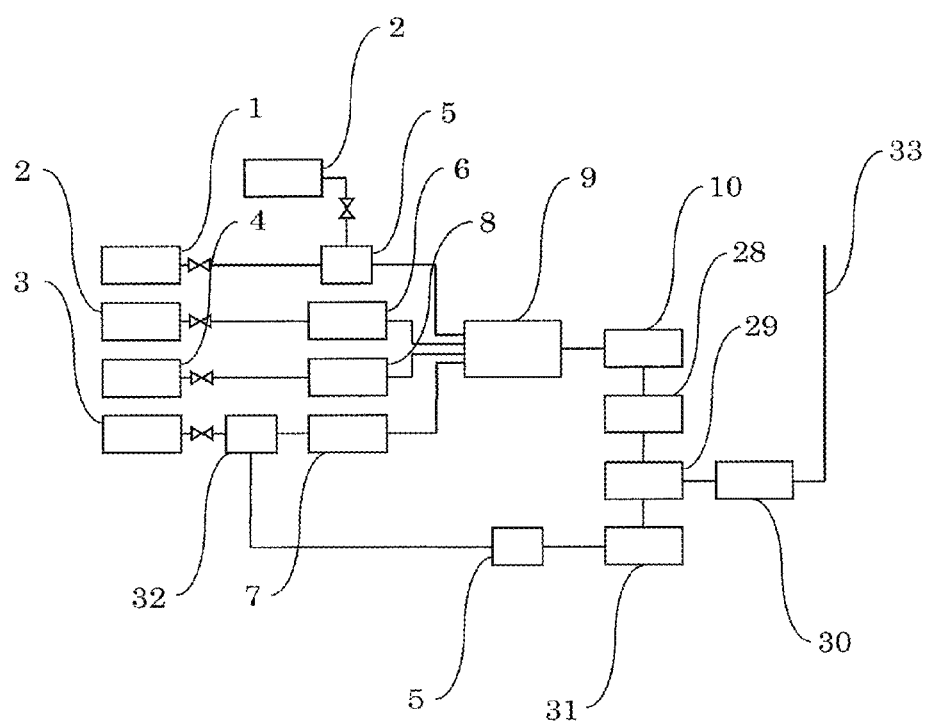
FIG. 4 shows a block diagram illustrating one example of the device system associated with the method of recovering ammonia and the method of reusing ammonia by using the same in the present invention.

FIG. 4 shows a block diagram illustrating one example of the device system associated with the method of recovering ammonia and the method of reusing ammonia by using the same in the present invention.

Figure 5:
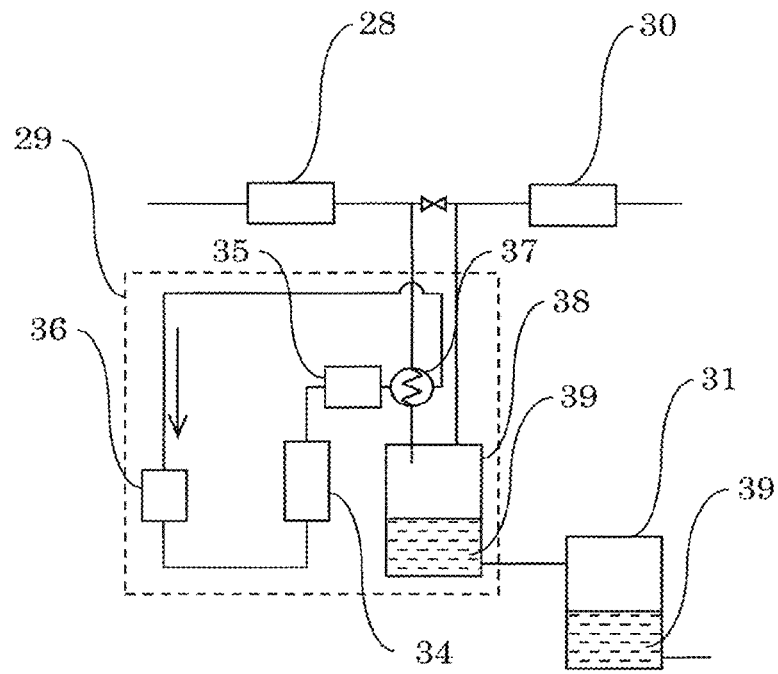
FIG. 5 shows a block diagram illustrating one example of the ammonia recovery device used in the present invention.
Figure 6:
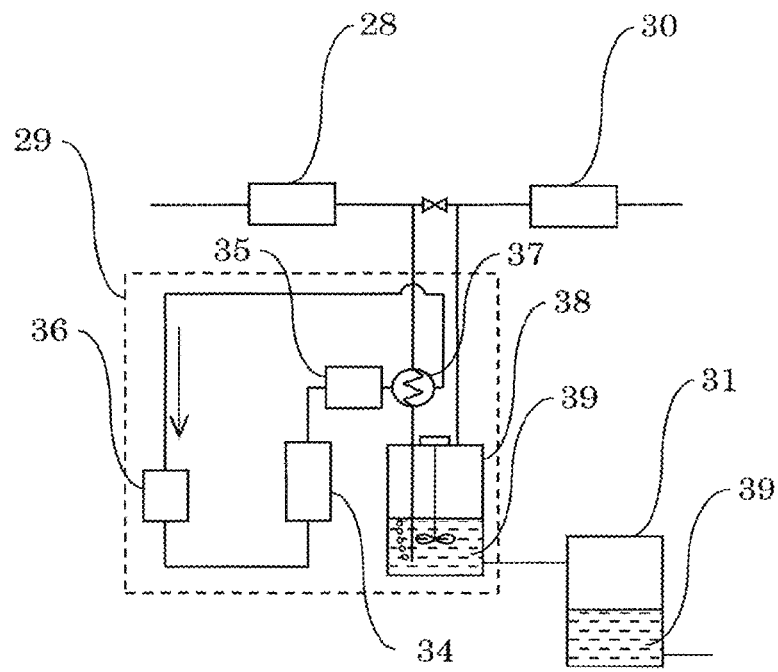
FIG. 6 shows a block diagram illustrating another example of the ammonia recovery device used in the present invention.

FIGS. 5 and 6 show a block diagram illustrating examples of the ammonia recovery device used in the present invention.

Figure 7:
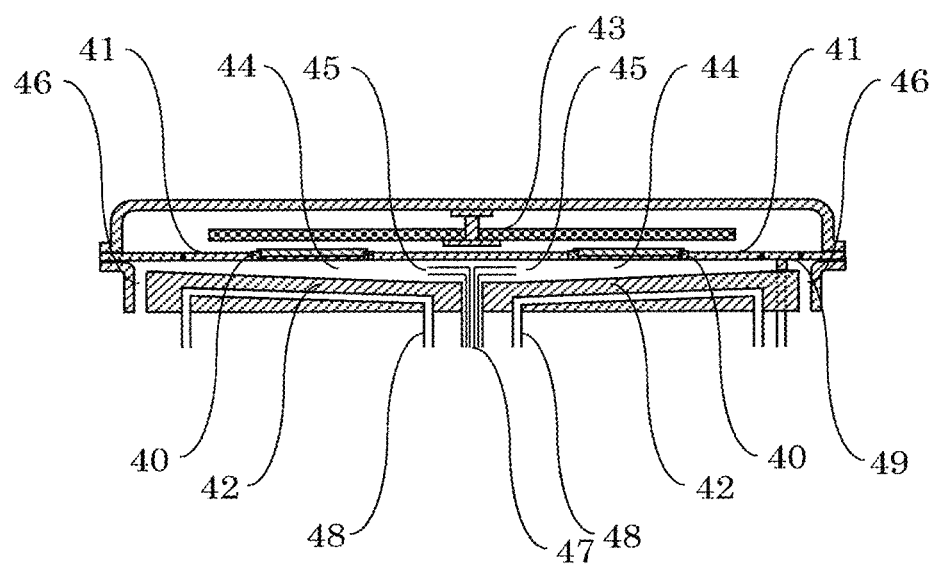
FIG. 7 shows a block diagram illustrating one example of the vapor phase growth device applicable to the present invention.

FIG. 7 shows a block diagram illustrating one example of the vapor phase growth device applicable to the present invention.

With reference to FIGS. 1 to 3, the method of recovering hydrogen from discharge gas discharged from the production process of a gallium nitride compound semiconductor and the method of reusing hydrogen by using the same in the present invention will be explained.

First, the production process of a gallium nitride compound semiconductor to which the method of recovering hydrogen is applied will be explained.

As shown in FIG. 1, in the production process of a gallium nitride compound semiconductor, for example, material supply sources (organic metal compound supply source 1, nitrogen supply source 2, ammonia supply source 3, and hydrogen supply source 4), purification devices 6 to 8 for source gases, a vapor phase growth device 9, and the like are used. Specifically, in the production process, the organic metal compound supply source 1, the nitrogen supply source 2, the purification device 6 purifying source gas supplied from the nitrogen supply source 2, the ammonia supply source 3, the purification device 7 purifying source gas supplied from the ammonia supply source 3, the hydrogen supply source 4, the purification device 8 purifying source gas supplied from the hydrogen supply source 4, and the vapor phase growth device 9 producing a gallium nitride compound semiconductor by using an organic metal compound supplied from the organic metal compound supply source 1 and gases supplied from the purification devices 6 to 8 are used.

The organic metal compound is used as source gas obtained by bubbling hydrogen or nitrogen in an organic metal liquid source (liquid source of trimethylgallium, triethylgallium, trimethylindium, triethylindium, trimethylaluminum, triethylaluminum, or the like), for example, in a carburetor 5. When ammonia is liquefied and recovered from discharge gas containing an organic metal, the organic metal may be dissolved in and then evaporated from an organic solvent such as THF to prevent the organic solvent from being inconveniently mixed with ammonia.

From the outlet of the vapor phase growth device 9, ammonia, hydrogen, nitrogen, and an organic metal compound derived from the organic metal in liquid source are discharged.

The method of recovering hydrogen in the present invention includes: a removal step of bringing discharge gas containing ammonia, hydrogen, nitrogen, and an organic metal compound discharged from the production process of a gallium nitride compound semiconductor as described above into contact with a cleaning agent prepared by impregnating an alkali metal compound with a metal oxide to remove the organic metal compound from the discharge gas; an ammonia decomposition step of bringing the discharge gas from which an organic metal compound is removed after the removal step into contact with an ammonia decomposition catalyst on heating to decompose the ammonia into nitrogen and hydrogen; and a hydrogen recovery step of bringing the discharge gas in which ammonia is decomposed into contact with palladium alloy membrane on heating to recover hydrogen that has penetrated through the palladium alloy membrane.

Specifically, as shown in FIG. 1, the method of recovering hydrogen in the present invention includes: a removal step of introducing discharge gas containing ammonia, hydrogen, nitrogen, and an organic metal compound from the vapor phase growth device 9 of a gallium nitride compound semiconductor to an organic metal compound removal tube 10 filled with a cleaning agent prepared by impregnating an alkali metal compound with a metal oxide to remove the organic metal compound from the discharge gas; and an ammonia decomposition step of introducing the discharge gas from which an organic metal compound is removed after the removal step to an ammonia decomposer 11 filled with an ammonia decomposition catalyst on heating to decompose the ammonia into nitrogen and hydrogen; and a hydrogen recovery step of introducing the discharge gas in which ammonia is decomposed after the ammonia decomposition step to a hydrogen selector 12 provided with palladium alloy membrane and bringing the discharge gas into contact with the palladium alloy membrane on heating to recover hydrogen that has penetrated through the palladium alloy membrane. A compressor (not shown) can be located upstream of the hydrogen separator 12 to improve the recovery rate of hydrogen in the hydrogen separator 12 under increased pressure.

The organic metal compound removal tube 10 used in the present invention has an inlet introducing discharge gas, an outlet discharging discharge gas after an organic metal compound is removed, and a removal tube main body provided with a discharge gas flow path stretched from the inlet to the outlet and filled with a cleaning agent prepared by impregnating an alkali metal compound with a metal oxide. The organic metal compound removal tube 10 conducts the removal step of bringing discharge gas introduced from the inlet into contact with the cleaning agent in the removal tube main body to remove an organic metal compound from the discharge gas. As the cleaning agent used in the present invention, a cleaning agent prepared by impregnating an alkali metal compound with a metal oxide is used. As the metal oxide, a metal oxide containing copper oxide and manganese oxide as the main components is typically used. However, metal oxides containing cobalt oxide, silver oxide, aluminum oxide, silicon oxide, or the like may be used. The content of copper oxide and manganese oxide in the metal oxide is typically 60 wt % or more, preferably 70 wt % or more in total. The ratio of manganese oxide to copper oxide is typically about 1:0.6 to 5.0, preferably about 1:1.0 to 3.0.

Examples of the alkali metal compound impregnated with the metal oxide include potassium hydroxide, sodium hydroxide, potassium oxide, and potassium carbonate. The amount of the alkali metal compound impregnated with the metal oxide is typically about 1 to 50 parts by weight, preferably about 3 to 20 parts by weight based on 100 parts by weight of the metal oxide. The impregnation amount of the alkali metal compound of more than 1 part by weight improves the removal efficiency in the organic metal compound. The impregnation amount of the alkali metal compound of 50 parts by weight or less increases the surface area of the metal oxide so as to improve the remove ability for the organic metal compound.

The ammonia decomposer 11 used in the present invention has, for example, an inlet introducing discharge gas, an outlet discharging discharge gas after ammonia is decomposed, and an ammonia thermal decomposition tube provided with a discharge gas flow path stretched from the inlet to the outlet and filled with an ammonia decomposition catalyst and a heater heating this catalyst. The ammonia decomposer 11 conducts the ammonia decomposition step of bringing the discharge gas introduced from the inlet into contact with the ammonia decomposition catalyst on heating to decompose ammonia into nitrogen and hydrogen in the thermal decomposition tube. As the ammonia decomposition catalyst, various decomposition catalysts can be used. However, from the viewpoint of efficiently decomposing ammonia at relatively low temperature for a long time, an alumina-supported ruthenium catalyst is preferably used, and an α-alumina-supported ruthenium catalyst with a specific surface area of 5 to 100 m$^2$/g is more preferably used. The contact temperature when ammonia is decomposed is typically 350 to 800° C. However, the contact temperature is preferably a relatively low temperature such as 400 to 600° C. in practical use from the viewpoint of the decomposition efficiency, the catalyst durability, the energy reduction, the prevention of the generation of nitrogen oxide, and the like, and from the view point of the temperature condition of hydrogen separation by using palladium alloy membrane in the next step.

In the present invention, the ammonia decomposer provided with one thermal decomposition tube can be used as described above. However, a device capable of decomposing ammonia until a low concentration is preferably used because discharge gas discharged from the production process typically contains about 10 to 40 vol % of ammonia. For example, to decrease the concentration of ammonia to 25 ppm or less as the acceptable concentration, a decomposer provided with two ammonia adsorption tubes 18 in addition to the ammonia thermal decomposition tube 17 is preferably used, for examples, as shown in FIG. 2.

The ammonia decomposer of FIG. 2 is configured so that gas decomposed by the ammonia thermal decomposition tube 17 can be introduced to the ammonia adsorption tubes 18 and brought into contact with ammonia adsorbent such as synthetic zeolite filled in the adsorption tubes to adsorb undecomposed ammonia contained in the gas. The two ammonia adsorption tubes 18 are alternately used. When one adsorption tube adsorbs undecomposed ammonia, the other adsorption tube reproduces its adsorbent. The adsorbent is reproduced by introducing inert gas from an inert gas supply line 21 while heating the adsorbent to desorb ammonia from the adsorbent and then by introducing the ammonia to the ammonia thermal decomposition tube 17 through a blower 19 and a heat exchanger 20.

The discharge gas after ammonia is decomposed into nitrogen and hydrogen is introduced to the hydrogen separator 12 as described above.

As shown in FIG. 3, the hydrogen separator used in the present invention is configured, for example, so that a plurality of palladium alloy tubes 22 formed from palladium alloy membrane are fixed to a tube sheet 23 at their opening ends and enclosed in a cell and so that the cell is divided into two spaces at the primary side and the secondary side by the palladium alloy tubes 22 and the tube sheet 23. The hydrogen separator 12 conducts the hydrogen recovery step of bringing the discharge in which ammonia is decomposed gas into contact with the palladium alloy membrane of the palladium alloy tubes 22 on heating to recover hydrogen that has penetrated through the palladium alloy membrane. When hydrogen is recovered from the discharge gas, the discharge gas is supplied from the inlet 25 to the heated cell at the primary side and brought into contact with palladium alloy membrane, and then only hydrogen permeates through the cell at the secondary side and extracted from the extraction outlet 26.

In the present invention, the temperature of the palladium alloy membrane when hydrogen permeates is typically 350 to 500° C., preferably 400 to 450° C. Typically, the gas to be processed needs to be preheated to around the above-mentioned temperature with a pre-heater or the like before introduced to the hydrogen separator. However, in the present invention, gas to be processed is heated to 400 to 600° C. when ammonia is decomposed so that hydrogen can permeate not by using a pre-heater or the like under a specific condition. In other words, hydrogen can permeate before the temperature of the gas to be processed decreases after ammonia is decomposed. When the pressure of gas is increased with a compressor, the compressor is preferably located before the ammonia decomposer 11 in consideration of the heat resistance of the compressor, so as to increase the recovery rate of hydrogen in the hydrogen separator. Thus, the compressor conducts the pressurization step of pressurizing the discharge gas after the removal step of removing an organic metal compound and before the hydrogen recovery step. However, if the pressure of discharge gas is increased too much, the decomposition rate of ammonia decomposed by an ammonia decomposition catalyst may decrease. Thus, the pressure of discharge gas is preferably about 0.3 to 0.8 MPa in gauge pressure. Hydrogen recovered from the extraction outlet 26 of the hydrogen separator 12 is stored in a container such as a hydrogen storage tank 14 under increased pressure.

The gas discharged from the processed gas discharge outlet 27 of the hydrogen separator 12 without penetrating the palladium alloy membrane passes through a pressure adjuster 13 and a gas emission line 16 to the outside and is then sent to the following processor or emitted into the atmosphere. This gas may contain hydrogen that has not penetrated the palladium alloy membrane. The recovered purified hydrogen can be not only reused for the below-mentioned production process of a gallium nitride compound semiconductor but also used as, for example, a source gas for fuel cells used in a hybrid vehicle and an electric vehicle.

The method of reusing hydrogen in the present invention is to supply hydrogen recovered from the production process of a gallium nitride compound semiconductor by the above-mentioned method of recovering hydrogen to the production process of a gallium nitride compound semiconductor.

Specifically, in the method, hydrogen is introduced from the hydrogen storage tank 14 to a gas mixer 15, mixed with hydrogen supplied from the hydrogen supply source 4, and supplied to the vapor phase growth device 9 of a gallium nitride compound semiconductor as shown in FIG. 1. The positions of the hydrogen purification device 8 and the gas mixer 15 can be changed so as to purify the mixed gas together. A compressor can be located between the hydrogen storage tank 14 and the gas mixer 15.

The method of reusing hydrogen of the present invention conducts a resupply step of supplying hydrogen recovered by the method of recovering hydrogen to the production process. In this method of reusing hydrogen, only after recovered in a certain amount by the method of recovering hydrogen, hydrogen can be reused. Furthermore, additional hydrogen can be added to the recovered hydrogen to continuously supply the recovered hydrogen to the vapor phase growth device. In this case, the amount supplied of the additional hydrogen is adjusted to the amount substantially equal to the amount of hydrogen lost by the above-mentioned method of recovering hydrogen after discharged gas is discharged from the production process of a gallium nitride compound semiconductor (e.g., |(amount supplied of additional hydrogen) (wt)−amount (wt) of hydrogen lost|/(amount (wt) of hydrogen lost) of 0.1 or less, preferably 0.05 or less, more preferably 0.01 or less).

The method of recovering ammonia in the present invention will be explained below.

The production process of a gallium nitride compound semiconductor to which the method of recovering ammonia is applied is the same as that to which the method of recovering hydrogen is applied. Accordingly, the reference numbers are omitted from the explanation.

The method of recovering ammonia in the present invention includes: a removal step of bringing discharge gas containing ammonia, hydrogen, nitrogen, and an organic metal compound discharged from the production process of a gallium nitride compound semiconductor into contact with a cleaning agent prepared by impregnating an alkali metal compound with a metal oxide to remove the organic metal compound from the discharge gas; and an ammonia recovery step of conducting a pressurization process and a cooling process by a heat pump to pressurize and cool the discharge gas from which an organic metal compound is removed after the removal step to liquefy the ammonia contained in the discharge gas and separate the liquefied ammonia from hydrogen and nitrogen so as to recover the liquefied ammonia.

Specifically, as shown in FIG. 4, the method of recovering ammonia includes: a removal step of introducing discharge gas containing ammonia, hydrogen, nitrogen, and an organic metal compound from the vapor phase growth device 9 of a gallium nitride compound semiconductor to an organic metal compound removal tube 10 filled with a cleaning agent prepared by impregnating an alkali metal compound with a metal oxide to remove the organic metal compound from the discharge gas; and an ammonia recovery step of pressurizing the discharge gas from which an organic metal compound is removed after the removal step with a gas compressor 28 and liquefying ammonia contained in the discharge gas with a heat pump type cooling device 29 and separating the ammonia from hydrogen and nitrogen so as to recover the ammonia as liquid.

The same cleaning agent prepared by impregnating an alkali metal compound with a metal oxide and the same removal tube filled with this cleaning agent as those described above are used.

The heat pump used in the present invention is capable of heat exchange with ambient environment by using the vaporization heat and the condensation heat of a heating medium capable of repeating the cycle of evaporation and liquefaction. The liquefaction of gas ammonia in the present invention is based on the principle cooling discharge gas by removing vaporization heat from the discharge gas when a heating medium (refrigerant) is depressurized to evaporate. The heat pump used in the present invention is based on the principle cooling discharge gas by removing vaporization heat from the discharge gas when a refrigerant is depressurized to evaporate. As the heat pump type cooling device 29 used in the present invention, for example, a cooling device provided with a refrigerant supplier 34, an expansion valve 35, a compression valve 36, a heat exchanger 37, and a liquid ammonia tank 38 can be used as shown in FIG. 5. In this cooling device, a liquid refrigerant sent to the expansion valve 35 by the refrigerant supplier 34 evaporates in the expansion valve 35 and removes heat from discharge gas containing ammonia in the heat exchanger 37 to cool the discharge gas and then liquefy the ammonia. Subsequently, the gas refrigerant is pressurized and liquefied by the compression valve 36 and sent back to the refrigerant supplier 34 so as to circulate in the cooling device.

In the present invention, since discharge gas is cooled based on such a principle, the cooling effect on ammonia is excellent compared to the method of merely exchanging heat between discharge gas and refrigerant. Like discharge gas discharged from the production process of a gallium nitride compound semiconductor, even if ammonia is contained in a content of about 10 to 40 vol %, it is not necessary to remove hydrogen and nitrogen or to substantially decrease the content of hydrogen and nitrogen, for example, by previously bubbling discharge gas in water to dissolve ammonia in water. Thus, ammonia in the discharge gas can be efficiently liquefied.

In the present invention, the refrigerant used for the heat pump type cooling device to liquefy ammonia is not limited in particular. However, the refrigerant is preferably the same ammonia as that to be liquefied because their heat properties are the same.

As shown in FIG. 6, when the pressurized discharge gas is supplied to the liquid ammonia tank 38, a discharge gas supply tube is preferably lowered to liquid ammonia 39 to conduct a bubbling step of bubbling the discharge gas in the liquid ammonia in terms of the cooling effect. Such an operation easily liquefies ammonia in discharge gas.

The stirring and removal step of stirring the liquid ammonia and removing hydrogen and nitrogen contained in the liquid ammonia is also preferably conducted. Such an operation can decrease the content of hydrogen and nitrogen contained in liquid ammonia as impurities to 1000 ppm or less. As the organic metal liquid source, liquid source of one or more kinds selected from trimethylgallium, triethylgallium, trimethylindium, triethylindium, trimethylaluminum, and triethylaluminum can be used. In this case, methane or ethane is generated during vapor phase growth. In the present invention, methane or ethane can be removed at the time of the liquefaction of ammonia. When the above-mentioned liquid source is used, methane (boiling point: −161° C.) or ethane (boiling point: −89° C.) contained in liquid ammonia (boiling point: −33° C.) can be efficiently removed by stirring liquid ammonia. The ammonia containing methane or ethane causes harmful effects on vapor phase growth, deteriorating the characteristics of the substrate.

In the method of recovering ammonia in the present invention, discharge gas discharged from the production process of a gallium nitride compound semiconductor is pressurized to 0.5 to 2 MPaG with the gas compressor 28 to easily liquefy ammonia after a metal compound such as gallium nitride passing the organic metal compound removal tube 10 without depositing on a substrate is filtered. Then, the pressurized discharge gas is cooled to −30 to −60° C. in the above-mentioned heat pump type cooling device 29. When pressurized with the gas compressor 28, a part of ammonia in the discharge gas may be liquefied. The liquid ammonia is sent to the liquid ammonia storage tank 31. The ammonia which remains as gas and the hydrogen and the nitrogen which are not liquefied are sent to the discharge gas purification device through the pressure regulator 30 and processed.

The method of reusing ammonia of the present invention includes: a mixed gas generation step of evaporating liquefied ammonia recovered from the production process of a gallium nitride compound semiconductor by the method of recovering ammonia and mixing the evaporated ammonia with additional ammonia different from the evaporated ammonia to obtain mixed gas; and a resupply step of purifying the mixed gas after the mixed gas generation step and supplying the purified mixed gas to the production process.

Specifically, as shown in FIG. 4, in the method, liquid ammonia in the liquid ammonia storage tank 31 is evaporated with a carburetor 5, mixed with ammonia supplied from the ammonia supply source with the gas mixer 32, purified, and supplied to the vapor phase growth device 9 of a gallium nitride compound semiconductor.

In this method of reusing ammonia of the present invention, only after recovered in a certain amount by the method of recovering ammonia, ammonia can be reused. Furthermore, newly additional ammonia (different from the recovered ammonia) can be added to the recovered ammonia to continuously supply the recovered ammonia to the vapor phase growth device. In this case, the amount supplied of newly additional ammonia (different from the recovered ammonia) is adjusted to the amount substantially equal to the amount of ammonia lost by the above-mentioned method of recovering ammonia after discharged gas is discharged from the production process of a gallium nitride compound semiconductor (e.g., |(amount supplied of additional ammonia) (wt)−amount (wt) of ammonia lost|/(amount (wt) of ammonia lost) of 0.1 or less, preferably 0.05 or less, more preferably 0.01 or less).

In the present invention, as the newly additional ammonia, ammonia for industrial purposes containing, for example, one or more kinds of impurities selected from oxygen, carbon dioxide, and water other than hydrogen and nitrogen can be used. The example of the method of purifying the mixed gas of recovered ammonia and newly added ammonia includes, for example, the method including bringing this mixed gas into contact with a catalyst containing manganese oxide or nickel as the active component and then with synthetic zeolite having a pore size of about 4 to 10 Å to remove one or more kinds of impurities selected from oxygen, carbon dioxide, and water (JP 4640882 B).

As the vapor phase growth device used in the present invention, a vapor phase growth device provided with, for example, a susceptor for holding a substrate, a heater heating the substrate, a source gas-inducing part supplying source gas to the substrate, a reactant gas-discharging part, and a light transmissive ceramics plate provided between the heater and the position where the substrate is held, the light transmissive ceramics plate being maintained or reinforced by a supporting member can be used (JP 2007-96280 A). As another vapor phase growth device, a vapor phase growth device of a group III nitride semiconductor provided with a susceptor for holding a substrate, a face opposite to the susceptor, a heater for heating the substrate, a source gas-inducing part provided at the center of the susceptor, a reactor formed from the space between the susceptor and the face opposite to the susceptor, and a reactant gas-discharging part provided in the outer side from the susceptor, in which the space between the substrate and the face opposite to the susceptor has 8 mm or less and 5 mm or less wide at the upstream and the downstream of the substrate, respectively, the face facing to the susceptor and having a structure circulating refrigerant, and the material of the part with which a source gas is contact in the reactor is formed of carbon, nitride, carbide, molybdenum, copper, alumina, or the composite material thereof can be used (JP 2010-232624 A). As another vapor phase growth device, a vapor phase growth device for a group III nitride semiconductor provided with a susceptor holding a substrate, a face opposite to the susceptor, a heater for heating the substrate, a reactor formed of the space between the susceptor and the face opposite to the susceptor, a source gas-introducing part supplying a source gas to the reactor, and a reactant gas-discharging part, in which the source gas-inducing part is provided with a first mixed gas port capable of supplying mixed gas formed by mixing ammonia, an organic metal compound, and carrier gas in any ratio and a second mixed gas port capable of supplying mixed gas formed by mixing two kinds selected from ammonia, an organic metal compound, and carrier gas or these three kinds in any ratio can be used (JP 2011-18895 A).

EXAMPLES

The present invention will be explained below by reference to Examples but is not limited thereto.

Example 1

Preparation of Vapor Phase Growth Device

In a stainless steel reactor, a disk-shaped susceptor 41 (made of SiC-coated carbon and capable of maintaining five 3-inch sized substrates with a diameter of 600 mm and a thickness of 20 mm), a face 42 (made of carbon) facing opposite to the susceptor and having a structure circulating refrigerant, a heater 43, a source gas-introducing part 45 (made of carbon), a reactant gas-discharging part 46, and the like were provided to prepare a vapor phase growth device 9 having a reactor 44 as shown in FIG. 7. Moreover, five 3-inch sized substrates formed of sapphire were set in a substrate holder 40. As a flow path 48 in which refrigerant circulates, one tube was arranged in helix form from the center to the periphery.

The source gas-introducing part vertically divided by two disc-shaped partitions (made of carbon) with a diameter of 200 mm and a thickness of 2 mm into three gas ports. The upper port, the middle port, and the lower port of these three gas ports were to supply ammonia, gas containing trimethylgallium, and nitrogen, respectively.

The horizontal distance between the each tip of the gas ports and the substrate was 32.4 mm. Source gas tubes 47 were connected to each gas flow path of the source gas-inducing part through amass flow controller or the like so as to supply gases at respective desired flow rates in respective desired concentrations.

Preparation of Organic Metal Compound Removal Tube 45 wt % of potassium hydroxide solution is sprayed on and impregnated in 2500 g of a commercially available hopcalite extrudate with a diameter of 1.5 mm and a length of 3 to 10 mm which is formed of the composition containing 70 wt % of manganese dioxide ($MnO_2$), 23 wt % of copper oxide (CuO), and 3 wt % of aluminum oxide ($Al_2O_3$) and then dried at 50° C. in a nitrogen atmosphere for 24 hours to prepare a cleaning agent in which 18 parts by weight of potassium hydroxide is impregnated with 100 parts by weight of hopcalite. This cleaning agent is filled 400 mm long in a SUS316 tube with an internal diameter of 80 mm and a length of 1000 mm to prepare an organic metal compound removal tube.

Preparation of Ammonia Decomposer

As the ammonia thermal decomposition tube 17, a reaction tube with an internal diameter of 80 mm and a length of 1000 mm, which is made of INCOLOY® 800, was prepared. In this reaction tube, an α-alumina-supported ruthenium catalyst as the ammonia decomposition catalyst was filled 500 mm long. An electric heater was installed on this reaction tube to heat this reaction tube from outside, so as to prepare a thermal decomposition tube.

Then, two adsorption tubes with an internal diameter of 110 mm and a length of 1350 mm, which are made of SUS316, were prepared. In these adsorption tubes, a tubular synthetic zeolite was filled 1200 mm long as ammonia adsorbent. An electric heater was installed on the adsorption tubes to heat these adsorption tubes from outside so as to prepare ammonia adsorption tubes. A blower 19 and a heat exchanger 20 were used together with these thermal decomposition tube and the ammonia adsorption tubes to prepare an ammonia decomposer shown in FIG. 2.

Preparation of Hydrogen Separator

The hydrogen separator as shown in FIG. 3 was produced as follows. 78 springs with an external diameter of 1.3 mm and a length of 240 mm which are formed from SUS316L steel coils with a diameter of 0.25 mm were each inserted in each of 78 palladium alloy tubes 22 with an external diameter 1.6 mm, an internal diameter of 1.45 mm, and a length of 245 mm which are formed of alloy of gold, silver, and palladium and heat-sealed at the end. Then, 78 through holes with a diameter of 1.6 mm were evenly provided in a disk-shaped flat plate with a diameter of 48.6 mm and a thickness of 5 mm but not provided in the periphery to prepare a nickel tube sheet 23. The 78 palladium alloy tubes were each inserted in each of the through holes and welded to and integrated with the tube sheet 23. This tube sheet was welded to a cylindrical SUS316L steel container with an external diameter of 48.6 mm. The container is provided with a discharge gas inlet 25, a purified hydrogen extraction outlet 26, and a processed gas discharge outlet 27. A heater 24 was installed on the steel container to prepare a hydrogen separator 12.

Preparation of Hydrogen Recovery System

A metal compound supply source 1, a nitrogen supply source 2, ammonia supply source 3, and a hydrogen supply source 4, purification devices 6 to 8 for source gases, a vapor phase growth device 9, an organic metal compound removal tube 10, an ammonia decomposer 11, a hydrogen separator 12 prepared as described above, and a hydrogen storage tank 14, and the like were connected to prepare a hydrogen recovery system as shown in FIG. 1. Moreover, a compressor and a pre-heater were located between the ammonia decomposer 11 and the hydrogen separator 12, and a compressor was located between the hydrogen storage tank 14 and the gas mixer 15.

Hydrogen Recovery Experiment

Source gases were supplied from the supply sources to the above-mentioned vapor phase growth device through the purification device to grow gallium nitride (GaN) on the surfaces of the substrates. As the purifier for the additional ammonia, a catalyst containing nickel as the active component and synthetic zeolite with a pore size of about 4 to 10 Å were used. For the vapor phase growth, the substrates were heated to 1050° C. after buffer layers were grown. Ammonia, triethylgallium and hydrogen, and nitrogen were supplied at 30 L/min, 60 cc/min and 30 L/min, and 40 L/min from the upper gas port, the middle gas port, and the lower gas port, respectively, to grow gallium nitride films for 2 hours.

At this time, discharge gas discharged from the vapor phase growth device was introduced and processed in the organic metal compound removal tube and the ammonia decomposer and further introduced in the hydrogen separator to recover hydrogen. The gas immediately before introduced in the hydrogen separator was set to have a gauge pressure of about 0.85 MPa. A part of each of gases discharged from the outlet of the vapor phase growth device, the outlet of the ammonia decomposer (ammonia adsorption tubes), and the purified hydrogen extraction outlet of the hydrogen separator was sampled. The temperature of the catalyst when ammonia is decomposed was about 500° C., and the temperature of the palladium alloy tubes when hydrogen is recovered was about 450° C. The temperature of adsorbent filled in the adsorption tubes of the ammonia decomposer was about 80° C.

As a result of the above-mentioned experiment, the components of discharge gas discharged from the vapor phase growth device were 30% of ammonia, 30% of hydrogen, and 40% of nitrogen. No ammonia was detected in gas discharged from the outlet of the ammonia decomposer (ammonia adsorption tubes). No gases other than hydrogen were detected in hydrogen obtained from the purified hydrogen extraction outlet of the hydrogen separator. The recovery rate of hydrogen was about 70%, including hydrogen generated when ammonia was decomposed.

Example 2

Preparation of Hydrogen Recovery System

Except for using no ammonia adsorption tubes, an ammonia decomposer was prepared in the same manner as Example 1. Except for locating a compressor between the organic metal compound removal tube and the ammonia decomposer but no pre-heaters, a hydrogen recovery system was prepared in the same manner as Example 1. This configuration is to introduce gas discharged from the ammonia decomposer to the hydrogen separator with suppressing the reduction of the temperature.

Hydrogen Recovery Experiment

Hydrogen recovery experiment was prepared and conducted in the same manner as Example 1 by using the above-mentioned recovery system. The gas immediately before introduced in the ammonia separator was set to have a gauge pressure of about 0.6 MPa. As a result, the components of discharge gas discharged from the vapor phase growth device were 30% of ammonia, 30% of hydrogen, and 40% of nitrogen. About 5000 ppm of ammonia was detected in gas discharged from the outlet of the ammonia decomposer. No gases other than hydrogen were detected in hydrogen obtained from the purified hydrogen extraction outlet of the hydrogen separator. The recovery rate of hydrogen was about 60%, including hydrogen generated when ammonia was decomposed.

Example 3

Hydrogen Reuse Experiment

The recovered hydrogen after the experiment of Example 1 ended was used as a part of the source gas, and then the hydrogen recovery experiment of Example 1 was conducted again. While the recovered hydrogen was supplied to the gas mixer 15, additional hydrogen was added to and mixed with this recovered hydrogen in an amount corresponding to the amount of hydrogen lost from the hydrogen supply source. The mixed hydrogen was supplied to the vapor phase growth device through the purification device and subjected to vapor phase growth. As a result, the vapor phase growth was conducted without any problems. Moreover, the analyses of the gases discharged from the outlet of the vapor phase growth device, the outlet of the ammonia decomposer (ammonia adsorption tubes), and the purified hydrogen extraction outlet of the hydrogen separator were about the same as Example 1.

Example 4

Preparation of Ammonia Recovery System

A vapor phase growth device and an organic metal compound removal tube were prepared in the same manner as Example 1. Subsequently, the organic metal compound removal tube 10 and a gas compressor 28 were installed in the outlet of the vapor phase growth device. Then, these were connected with a heat pump type cooling device 29 provided with a refrigerant (ammonia) supplier 34, an expansion valve 35, a compression valve 36, a heat exchanger 37, and a liquid ammonia tank 38 through tubes or the like to prepare an ammonia recovery device as shown in FIG. 6. Furthermore, a pressure regulator 30, a liquid ammonia storage tank (in cylindrical form) 31, an ammonia carburetor 5, and the like were connected through tubes or the like to prepare an ammonia recovery system as shown in FIG. 4.

Ammonia Recovery Experiment

Source gases were supplied from the supply sources to the above-mentioned vapor phase growth device through a purification device to grow gallium nitride (GaN) on the surfaces of the substrates. As the purifier for the additional ammonia, a catalyst containing nickel as the active component and synthetic zeolite with a pore size of 4 to 10 Å were used. For the vapor phase growth, the substrates were heated to 1050° C. after buffer layers were grown. Ammonia, TMG and hydrogen, and nitrogen, were supplied at 30 L/min, 60 cc/min and 30 L/min, and 40 L/min from the upper gas port, the middle gas port, and the lower gas port, respectively, to grow gallium nitride films for 2 hours.

At this time, while a part of discharge gas discharged from the vapor phase growth device was sampled, the gas compressor 28, the heat pump type cooling device 29, the stirrer, and the like were operated to liquefy ammonia in the discharge gas and collect the liquefied ammonia in the liquid ammonia storage tank 31. The discharge gas was pressurized from normal pressure to 1 MPaG with the gas compressor and cooled to −40 to −45° C. with the heat pump type cooling device.

As a result of measurement, the components of discharge gas discharged from the vapor phase growth device were 30% of ammonia, 30% of hydrogen, and 40% of nitrogen. The recovery rate of ammonia in the liquid ammonia tank 38 was 80%. The contents of hydrogen and nitrogen contained in the liquid ammonia were 20 ppm and 120 ppm, respectively.

Example 5

Ammonia Reuse Experiment

Liquid ammonia recovered in the above-mentioned manner was supplied to the liquid ammonia storage tank 31 shown in FIG. 4. After vapor phase growth was prepared in the above-mentioned manner, the recovered liquid ammonia is evaporated with the carburetor 5 and supplied to the gas mixer 15, and ammonia for industrial purposes from the ammonia supply source was added to and mixed with the recovered ammonia in an amount equal to the amount of ammonia lost by the recovery of ammonia. The mixed ammonia was supplied to the vapor phase growth device through the purification device and subjected to vapor phase growth. The ratio of the amount of the recovered liquid ammonia to that of the supplied ammonia for industrial purposes was 80:20.

For the vapor phase growth of gallium nitride, the substrates were heated to 1050° C. after buffer layers were grown, and ammonia, TMG and hydrogen, and nitrogen, were supplied at 30 L/min, 60 cc/min and 30 L/min, and 40 L/min from the upper gas port, the middle gas port, and the lower gas port, respectively, to grow gallium nitride films for 2 hours, in the same manner as Example 1. At this time, ammonia was recovered. After this experiment ends, the substrates were removed from the vapor phase growth device and evaluated. As a result, the substrates having equal performance to those of Example 1 were confirmed to be obtained. The recovery rate of ammonia in the liquid ammonia tank 38 was 80%. The contents of hydrogen and nitrogen contained in the liquid ammonia were 22 ppm and 140 ppm, respectively.

As described above, the method of recovering ammonia in the present invention can efficiently and easily recover hydrogen and ammonia from discharge gas discharged from the production process of a gallium nitride compound semiconductor. The method of reusing hydrogen or ammonia of the present invention can easily supply the recovered hydrogen or ammonia to the production process of a gallium nitride compound semiconductor and reuse the recovered hydrogen or ammonia without having harmful effects on vapor phase growth.

REFERENCE SIGNS LIST

1 Organic metal compound supply source
2 Nitrogen supply source
3 Ammonia supply source
4 Hydrogen supply source
5 Carburetor
6 Nitrogen purification device
7 Ammonia purification device
8 Hydrogen purification device
9 Vapor phase growth device
10 Organic metal compound removal tube
11 Ammonia decomposer
12 Hydrogen separator
13 Pressure regulator
14 Hydrogen storage tank
15 Gas mixer
16 Gas emission line to the outside
17 Ammonia thermal decomposition tube
18 Ammonia adsorption tube
19 Blower
20 Heat exchanger
21 Inert gas supply line
22 Palladium alloy tube
23 Tube sheet
24 Heater
25 Discharge gas inlet
26 Purified hydrogen extraction outlet
27 Processed gas discharge outlet
28 Gas compressor
29 Heat pump type cooling device
30 Pressure regulator
31 Liquid ammonia storage tank
32 Gas mixer
33 Gas emission line to the outside
34 Refrigerant supplier
35 Expansion valve
36 Compression valve
37 Heat exchanger
38 Liquid ammonia tank
39 Liquid ammonia
40 Substrate holder
41 Susceptor
42 Face opposite to the susceptor
43 Heater
44 Reactor
45 Source gas-inducing part
46 Reactant gas-discharging part
47 Source gas tube
48 Flow path circulating refrigerant
49 Susceptor rotating plate

The invention claimed is:

1. A method of recovering ammonia comprising:
a removal step of bringing discharge gas containing ammonia, hydrogen, nitrogen, and an organic metal compound discharged from the production process of a gallium nitride compound semiconductor into contact with a cleaning agent prepared by impregnating an alkali metal compound with a metal oxide to remove the organic metal compound from the discharge gas; and
an ammonia recovery step of conducting a pressurization process and a cooling process by a heat pump to pressurize and cool the discharge gas from which an organic metal compound is removed after the removal step to liquefy the ammonia contained in the discharge gas and separate the liquefied ammonia from hydrogen and nitrogen so as to recover the liquefied ammonia.

2. The method of recovering ammonia according to claim 1, wherein the cleaning agent is prepared by impregnating potassium hydroxide, sodium hydroxide, potassium oxide, or potassium carbonate with a metal oxide containing copper oxide and manganese oxide as the main components.

3. The method of recovering ammonia according to claim 1, wherein the content of ammonia contained in discharged gas discharged from the production process is 10 to 40 vol %.

4. The method of recovering ammonia according to claim 1, wherein the pressure of discharge gas during the pressurization process is 0.5 to 2 MPaG.

5. The method of recovering ammonia according to claim 1, wherein the temperature of discharge gas during the cooling process is −30 to −60° C.

6. The method of recovering ammonia according to claim 1, further comprising a bubbling process of bubbling discharge gas pressurized by the pressurization process in liquid ammonia.

7. The method of recovering ammonia according to claim 6, further comprising a stirring and removal step of stirring the liquid ammonia and removing hydrogen and nitrogen contained in the liquid ammonia.

8. The method of recovering ammonia according to claim 7, wherein the stirring and removal step further removes methane or ethane resulted from the decomposition of the organic metal compound derived from one or more kinds of organic metal sources selected from trimethylgallium, triethylgallium, trimethylindium, triethylindium, trimethylaluminum, and triethylaluminum from the liquid ammonia.

9. The method of recovering ammonia according to claim 1, wherein
the production process includes decomposing the organic metal compound derived from one or more kinds of organic metal sources selected from trimethylgallium, triethylgallium, trimethylindium, triethylindium, trimethylaluminum, and triethylaluminum during vapor phase growth, and
the ammonia recovery step includes separating methane or ethane resulted from the decomposition of the organic metal compound during the production process from the ammonia when the ammonia is liquefied.

10. The method of recovering ammonia according to claim 1, wherein refrigerant used in the cooling process conducted by the heat pump is ammonia.

11. The method of recovering ammonia according to claim 1, wherein carrier gases used in the production process are hydrogen and nitrogen.

12. The method of recovering ammonia according to claim 1, wherein the production process includes bubbling hydrogen or nitrogen in liquid source of one or more kinds selected from trimethylgallium, triethylgallium, trimethylindium, triethylindium, trimethylaluminum, and triethylaluminum to obtain a source gas containing the organic metal compound derived from an organic metal source used in the production process.

13. The method of recovering ammonia according to claim 7, wherein the stirring and removal step decreases the content of hydrogen and nitrogen contained in liquid ammonia as impurities to 1000 ppm or less.

14. A method of reusing ammonia, comprising:
a mixed gas generation step of evaporating liquefied ammonia recovered by the method of recovering ammonia according to claim 1 and mixing the evaporated ammonia with additional ammonia different from the evaporated ammonia to obtain mixed gas; and a resupply step of purifying the mixed gas after the mixed gas generation step and supplying the purified mixed gas to the production process.

15. The method of reusing ammonia according to claim 14, wherein the amount supplied of the additional ammonia is substantially equal to the amount of ammonia lost by the method of recovering ammonia after discharged gas is discharged from the production process.

16. The method of reusing ammonia according to claim 14, wherein the additional ammonia is ammonia for industrial purposes, containing hydrogen and nitrogen as impurities.

* * * * *